United States Patent [19]

Doran

[11] Patent Number: 5,194,322
[45] Date of Patent: Mar. 16, 1993

[54] COATED TEXTILE MATERIALS

[75] Inventor: Frederick Doran, Haslingden, United Kingdom

[73] Assignee: Scapa Group Plc, Blackburn, England

[21] Appl. No.: 613,588

[22] PCT Filed: Jun. 5, 1989

[86] PCT No.: PCT/GB89/00621
§ 371 Date: Dec. 3, 1990
§ 102(e) Date: Dec. 3, 1990

[87] PCT Pub. No.: WO89/12135
PCT Pub. Date: Dec. 14, 1989

[30] Foreign Application Priority Data

Jun. 4, 1988 [GB] United Kingdom ............... 8813250

[51] Int. Cl.$^5$ .......................... B32B 3/26; B05D 3/12
[52] U.S. Cl. .................................. 428/267; 427/244; 427/359; 427/369; 427/373; 428/268; 428/269; 428/280; 428/290; 428/314.2
[58] Field of Search ............ 427/244, 359, 369, 373; 428/267, 268, 280, 290, 314.2

[56] References Cited

U.S. PATENT DOCUMENTS

| 3,713,868 | 1/1973 | Gordon et al. | 428/314.2 |
| 3,804,700 | 4/1974 | Hoey | 428/314.2 |
| 4,001,158 | 1/1977 | Lindemann | 521/65 |
| 4,232,087 | 11/1980 | Trask | 428/389 |
| 4,547,423 | 10/1985 | Kojima et al. | 428/315.5 |

FOREIGN PATENT DOCUMENTS

| 32744 | 7/1981 | European Pat. Off. |
| 194534 | 9/1986 | European Pat. Off. |
| 246917 | 11/1987 | European Pat. Off. |
| 2007992 | 1/1970 | France |

Primary Examiner—William J. Van Balen
Attorney, Agent, or Firm—Keck, Mahin & Cate

[57] ABSTRACT

A coated textile material, particularly for use as a durable filter fabric, is made from a textile substrate, such as a woven fabric, having a microporous coating of an elastomeric fluorocarbon polymer. The substrate may be formed from aramid or polyphenylene sulphide or glass fibres. The elastomeric polymer may be a vinylidene fluoride pentafluoropropene tetrafluoroethylene terpolymer. The microporous coating may be applied as a formed aqueous emulsion which is dried and mechanically crushed.

12 Claims, No Drawings

COATED TEXTILE MATERIALS

This invention relates to a coated textile material or fabric comprising a textile substrate having applied thereto a microporous polymeric coating, particularly although not exclusively, for use as a filter fabric for hot gas filtration. The term 'coated' is not restricted to application of layers exclusively on the surface of textile substrates but also covers cases where substantial penetration of the textile substrate occurs.

It is well known to form a coated textile material by applying a layer of a mechanically foamed aqueous emulsion of a synthetic elastomeric polymer to a textile substrate using a knife-spreading technique. Usually acrylic emulsions are used and the dried, spread layer is subjected to roller pressure to give a coating of what is commonly termed 'crushed foam'. This process has been much used to give light and flexible polymeric coating for the enhancement of furnishing fabrics. Also the process has been used in the production of industrial filter fabrics to give fine open cell structured membranes with excellent gas permeability. In particular, in the context of dust filtration, it has been found that the performance of a filter fabric can be enhanced by coating the fabric with a microporous synthetic elastomer membrane, and that cell size can be controlled to within fine limits. Filtration performance is markedly improved in many applications with reduced pressure drop across the filter and improved particulate retention and cleaning efficiency.

However, there is a requirement for dry filtration media capable of operating at high temperatures such as 190° to 250° C. using specialised fabrics formed from materials such as aramids and polyphenylene sulphide fibres, and difficulty has been encountered in finding suitable polymeric materials which can be conveniently coated onto these specialised fabrics to form satisfactory microporous membranes with adequate temperature resistance, durability and coating adhesion.

Non-aqueous solvent-based solutions and liquids of high temperature-resistant polymers, such as silicones, have been tried but it has not been found possible to obtain a satisfactory fine regular cellular structure using foaming techniques based on chemical blowing agents, coagulation or reticulation. Silicone elastomeric aqueous emulsions are available but the low molecular weight polymers used to obtain satisfactory emulsification may not always be conducive to good temperature resistance and durability.

An object of the present invention is to provide a coated textile material which is convenient to manufacture and which has good permeability and also good temperature resistance and durability.

According to the invention therefore there is provided a coated textile material comprising a textile substrate having applied thereto a microporous coating of an elastomeric co-polymer of which at least one component is a fluorocarbon, characterised in that the coating is formed as a compressed foam layer at the surface of the textile substrate, and set to form a coherent porous membrane.

Using this polymer it has been found possible to achieve a coated textile material having excellent permeability, temperature resistance, substrate/coating adhesion and durability. Also the product can demonstrate excellent chemical resistance and high resilience, and facilitates cleaning of dust cakes.

Moreover, the coated textile material is convenient to manufacture and in particular can be made by application of the polymer from a foamed aqueous emulsion to the textile substrate using a compressive coating technique to give a crushed foam microporous membrane.

Thus, and in accordance with a second aspect of the present invention there is provided a method of forming a coated textile material wherein a foamed aqueous emulsion of an elastomeric copolymer of which at least one component is a fluorocarbon is applied to the surface of a textile substrate characterised by use of a compressive coating technique which constrains the foamed emulsion to form a compressed foam layer at said surface, and in that said layer is set to form a coherent porous membrane.

The aqueous emulsion may be foamed mechanically in any suitable manner e.g. by mechanical agitation with a rotary blade or the like and/or by injection of compressed air or other gas.

The coating technique may involve the use of a spreading device such as a doctor blade or the like followed by a drying stage followed by the use of compressive device such as a roller which compresses or crushes the dried, spread foam layer to form a microporous membrane.

Setting of the applied layer may be effected by application of an external influence such as heat or other radiation and/or by allowing the layer to set e.g. due to cross-linking of the polymer as initiated by a cross-linking agent incorporated into the emulsion prior to application to the textile substrate.

Other substances such as catalysts, foam stabilizers, surfactants, fillers etc. may also be incorporated in the emulsion.

Any textile substrate may be used. The term textile substrate is used in a broad sense to encompass any suitable fabric or fibrous material which may be woven or non-woven or of any other appropriate construction. Where continuous operation in the temperature range 190°-250° C. is required, fabrics, which may be non-woven fabrics such as needle felts, formed from aramid fibres and/or polyphenylene sulphide fibres are especially suitable. It has also been found that the invention is particularly advantageous when applied to glass fibre fabrics, particularly woven fabrics. In this context the coating acts to provide cohesion and also a lubrication effect within the fabric between the fibres whereby disintegration and inter-fibre abrasion on flexing is reduced and the durability of the fabric is much enhanced. Good flexing performance is especially important in the case of a filter fabric in so far as flexing is utilised in use for filtration purposes and/or during cleaning.

With regard to the fluorocarbon material this may be formed from any of the various synthetic rubbers identified as fluorine containing elastomers, in particular those formed from vinylidene fluoride, pentafluoropropene, tetrafluoroethylene, hexafluoropropene, and polymers thereof, examples of which are vinylidene fluoride pentafluoropropene tetrafluoroethylene terpolymer and vinylidene fluoride hexafluoropropene tetrafluorethylene terpolymer.

The invention will now be described further in the following example.

EXAMPLE 1

Immediately prior to use, the following ingredients are initially mixed. Vinylidene fluoride hexafluoropropene tetrafluoroethylene elastomer latex

| | |
|---|---|
| N,N' Dicinnamylidene-1,6-Hexanediamine cross-linking agent | 5 parts |
| Inorganic filler | 5 parts |
| Metal Oxide | 5 parts |
| Surfactant | 1 part |

The resulting aqueous polymer dispersion is then combined with other ingredients to produce a mixture suitable for mechanical foaming, as follows:

| | |
|---|---|
| Aqueous polymer dispersion | 100 parts |
| Polymer thickener | as required |
| Ammonium Stearate | 2 parts |
| Ammonia (solution 30%) | 2 parts |
| Fluorosurfactant | 0.1 part |

The polymer thickener is a Ph sensitive polymer emulsion thickener and is used to control viscosity. The fluorosurfactant is used to enhance surface activity and encourages foaming.

The mixture is mechanically foamed by introducing air under pressure in a mechanical foaming machine. Cell size is controlled by altering rotor speeds in the foamer head. Foam prepared to a desired density (e.g. 0.2 gm/cc) is deposited onto a moving fabric by means of a coating blade behind a foam bank. The coating is then dried and lightly crushed by passing between pressure rollers. If the resulting cell structure is seen to be correct in relation to desired air porosity and durability and adhesion to the textile substrate, the coating is cured at high temperature. Typical curing conditions are 15 minutes at 180° C.

The textile substrate may be a non-woven fabric such as a needle felt formed from aramid or polyphenylene sulphide fibres.

The resulting coated fabric has excellent filtration properties and is suitable for use for example for filtering dust from gas streams. The polymeric coating defines a microporous membrane having a fine regular cell structure. The coated fabric has excellent chemical resistance, durability and coating adhesion and is suitable for continuous use at temperatures in the range 190°–250° C.

EXAMPLE 2

Example 1 was repeated using, in place of the non-woven substrate, a glass fibre fabric having the following characteristics:

| | |
|---|---|
| fabric weight | 440 (g/m$^2$) |
| yarn count/cm warp/weft | 17 × 9 |
| weave | 3 × 1 Twill |

The resulting fabric when having a coating of 277 g/m$^2$ demonstrated excellent filtration properties and superior flex performance.

In order to test the flex performance in general of coated glass fibre filter fabrics, the above proprietary fabric and also a fabric supplied by JPS Industrial Textiles under the trade designation 651 (Acid Gard) were subjected to repeated flexing in the warp direction against a flex plate. The number of flexes to failure was recorded both coated with different weights of the coating material (with the coating against the flex plate) and uncoated and the results were as follows:

| Material | Flexes to failure |
|---|---|
| 1. JPS Industrial Textiles 651 Acid Gard | |
| 80 g/m$^2$ coating | 14,200 |
| same uncoated | 450 |
| 2. 440 g/m$^2$ glass fibre fabric | |
| 300 g/m$^2$ coating | 58,500 |
| same uncoated | 600 |
| 3. 440 g/m$^2$ glass fibre fabric (different sample) | |
| 200 g/m$^2$ coating | 5,700 |
| same uncoated | 500 |

Thus, even moderate amounts of coating material can provide sufficient cohesion to enhance significantly the flex performance of the fabric.

Because of the flexible nature of the coating it can be retained on the fabric for long periods of use. The coating acts both to give enhanced separation efficiency and lower pressure drop for filtration purposes and also gives internal glass fibre lubrication to reduce abrasion and prolong flexing life.

It is of course to be understood that the invention is not intended to be restricted to the details of the above Examples.

I claim:

1. A coated textile material comprising a textile substrate having applied thereto a microporous coating of an elastomeric copolymer wherein at least one component thereof is a fluorocarbon, wherein the coating is formed as a compressed foam layer at the surface of the textile substrate, said layer being compressed on the said surface and being set to form a coherent porous membrane.

2. A method of forming a coated textile material wherein a foamed aqueous emulsion of an elastomeric copolymer of which at least one component is a fluorocarbon is applied to the surface of a textile substrate by use of a compressive coating technique which constrains the foamed emulsion to form a compressed foam layer at said surface by compression of the foam on said surface, and wherein said layer is set to form a coherent porous membrane.

3. A method according to claim 2 wherein the aqueous emulsion is foamed mechanically.

4. A method according to claim 2 wherein the layer is set by application of heat.

5. A method according to claim 2 characterised by the use of a spreading device followed by a drying stage followed by a compressive device which compresses or crushes the dried, spread foam layer to form a microporous membrane.

6. A coated textile material made by the method of claim 2.

7. A coated textile material according to claim 1 wherein the textile substrate is formed from aryl-amide fibres.

8. A coated textile material according to claim 1 wherein the textile substrate is formed from polyphenylene sulphide fibres.

9. A coated textile material according to claim 1 wherein the textile substrate is formed from glass fibres.

10. A coated textile material according to claim 1, wherein the textile substrate is a woven fabric.

11. A coated textile material according to claim 10 wherein the elastomer is selected from copolymers of two or more of vinylidene fluoride, pentafluoropropene, tetrafluoroethylene and hexafluoropropene.

12. A coated textile material according to claim 1 in the form of a filter fabric.

* * * * *